Nov. 19, 1929.  E. SCHARPENBERG  1,736,630
PIPE CLIP
Filed Aug. 15, 1928
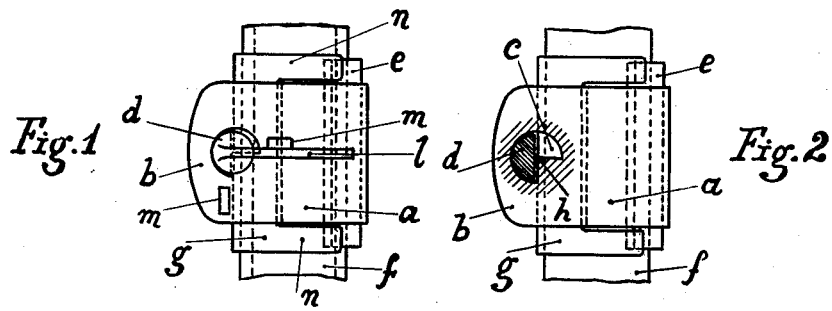
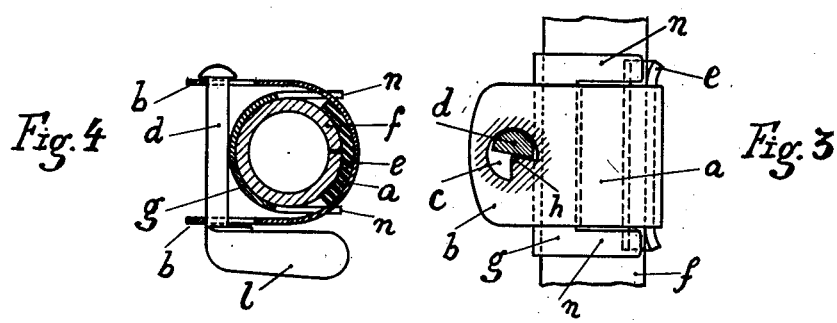
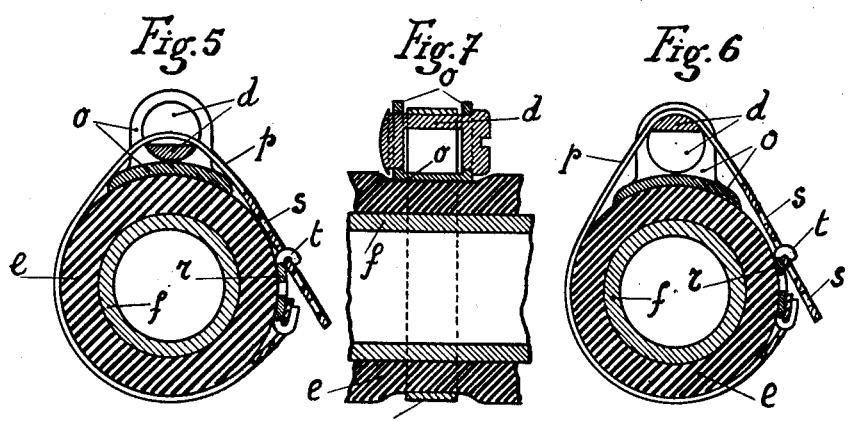
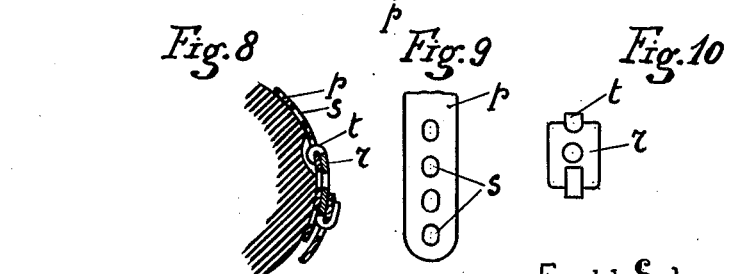
Inventor:
Ewald Scharpenberg.
By *Jno Smirie* Attorney:

Patented Nov. 19, 1929

1,736,630

UNITED STATES PATENT OFFICE

EWALD SCHARPENBERG, OF WETTER-ON-THE-RUHR, GERMANY

PIPE CLIP

Application filed August 15, 1928, Serial No. 299,859, and in Germany August 22, 1927.

My present invention relates to pipe-clips intended to be applied to and tightened around pipes for the purpose of making burst or otherwise untight pipes tight again. The object of my invention is to provide a pipe clip of this type, that is one which may also be used for connecting hoses to pipes and making them tight, for instance hoses of fire-engines, hoses of compressed air tools and the like. Broadly stated my invention consists in providing a flattened excentric pin, the rotation of which will cause the tightening of a clip applied around hoses and pipes.

In the accompanying drawings I have illustrated two preferred forms of embodiments of my invention. In these drawings:

Figs. 1 to 3 are side views of the first embodiment and

Fig. 4 is a cross section thereof;

Figs. 5 and 6 are cross sections of the second embodiment.

Fig. 7 is a longitudinal section of same and

Figs. 8 to 10 show details thereof.

Referring to Figs. 1 to 4, $a$ designates a U-shaped clip or band having straight end portions $b$ provided with registering holes $c$, wherein a pin $d$ is journaled, said pin being flattened, that is made eccentric on its portion comprised between the end portions $b$ of the clip.

Arranged within the clip is a packing $e$ of rubber, leather or other suitable material, intended to be applied against the burst portion of the pipe $f$. In the case of pipes of soft material, such as lead, and hose, I insert a layer $g$ of hard material such as iron, between the pipe or hose $f$ and pin $d$, the flattened portion of the latter being turned towards the layer $g$ as shown in Figs. 1, 2 and 4. The layer $g$ is provided with projections $n$ which prevent the same from being disengaged from the clip $a$.

Now the pin $d$ will be turned to somewhat more than 90 degrees into the position shown in Fig. 3, whereby the clip $a$ and packing $e$ will be firmly tightened around the pipe $f$ or hose and untight portions thereof made tight again.

In order to limit the positions of the pin $d$ shown in Figs. 1, 2 and 4, as well as in Fig. 3, I may provide a tongue $h$ of triangular shape in the holes $c$ in the end portions $b$, or I may provide abutments or lugs $m$ on one end portion $b$, with which the handle $l$ serving to rotate the pin $d$ will come into engagement.

In the case of pipes made or iron or steel the layer $g$ may be omitted and if it is desired to connect hoses to pipes, the packing $e$ may be omitted.

Referring to Figs. 5 to 10, $e$ is a length of hose applied around the pipe $f$, the flattened or eccentric pin $d$ being journaled in a bearing $o$ arranged axially to the said pipe. The clip, as shown in the drawings, is formed of a thin steel strip $p$ extending around the hose $e$ and pin $d$. As shown one end of the strip $p$ is attached to a connecting member $r$, whilst its other end is provided with a series of adjusting holes $s$ intended to engage a hook $t$ of said connecting member $r$. Therefore the strip $p$ of the clip may be adjusted for pipes and hoses of different diameters. As shown in Fig. 8 the hook $t$ of the connecting member is turned towards the inside, and the end of the strip $p$ will therefore be arranged below said member. The clip may also be used without connecting member $r$, provided the ends of the strip $p$ are soldered, brazed or riveted together. In this case the strip $p$ will be endless and not adjustable.

Instead of a single clip I may also apply two clips or strips arranged at a certain distance apart from each other.

Upon the rotation of the pin $d$ from the position shown in Fig. 5 to the position shown in Figs. 6 and 7, the strip $p$ will be firmly tightened, and the hose $e$ firmly pressed around the pipe $f$. At the place where the strip $p$ is not in contact with the hose $e$, the base-plate of the bearing $o$ is placed upon the latter and firmly pressed upon the same, so that the hose $e$ will be perfectly pressed at all points around the pipe.

Having now fully described my said invention, what I claim and desire to secure by Letters Patent, is:

1. A pipe-clip including a flat flexible strip to encircle the pipe, a bearing member to be arranged axially of the pipe, and an eccentrically flattened pin journaled in said bearing to underlie the strip, the movement of the pin tightening the strip with respect to the pipe.

2. A pipe-clip including a flat flexible strip, means for connecting the ends of the strip removably together to cause the strip to encircle the pipe, a bearing member to be positioned on the pipe, and an eccentrically flattened pin journaled in said bearing and underlying the strip, the movement of the pin serving to tighten the strip with respect to the pipe.

3. A pipe-clip including a flat flexible strip, means for adjustably connecting the ends of the strip to arrange said strip about a pipe, a bearing member to be arranged in contact with the pipe, and an eccentric pin journaled in the bearing member and underlying the strip, the movement of the pin serving to tighten the strip with respect to the pipe.

4. A pipe-clip including a flat flexible strip, a hook removably carried by one end of the strip, the opposite end of the strip being formed with a plurality of openings with any one of which the hook is adapted to engage to adjust the strip about a pipe, a bearing member to removably seat on the exterior of the pipe, a pin mounted in said bearing member and arranged axially of the pipe, said pin having an eccentric portion to bear beneath the strip and serving in the rotation of the pin to tighten the strip with respect to the pipe.

In testimony whereof I have hereunto set my hand.

EWALD SCHARPENBERG.